United States Patent
Babcock et al.

(10) Patent No.: US 10,781,359 B2
(45) Date of Patent: Sep. 22, 2020

(54) MISCIBLE SOLVENT ENHANCED OIL RECOVERY

(71) Applicants: Linde Aktiengesellschaft, Munich (DE); John A. Babcock, Houston, TX (US)

(72) Inventors: John A. Babcock, Houston, TX (US); Charles P. Siess, III, Conroe, TX (US); Kevin G. Watts, Spring, TX (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 15/383,012

(22) Filed: Dec. 19, 2016

(65) Prior Publication Data

US 2017/0292059 A1    Oct. 12, 2017

Related U.S. Application Data

(60) Provisional application No. 62/319,856, filed on Apr. 8, 2016.

(51) Int. Cl.
| | |
|---|---|
| *E21B 43/16* | (2006.01) |
| *C09K 8/58* | (2006.01) |
| *C09K 8/584* | (2006.01) |
| *C09K 8/594* | (2006.01) |

(52) U.S. Cl.
CPC ............... *C09K 8/58* (2013.01); *C09K 8/584* (2013.01); *C09K 8/594* (2013.01); *E21B 43/16* (2013.01)

(58) Field of Classification Search
None
See application file for complete search history.

(56) References Cited

U.S. PATENT DOCUMENTS

| | | |
|---|---|---|
| 3,035,637 A | 5/1962 | Allen |
| 3,316,965 A | 5/1967 | Watanabe |
| 3,319,712 A | 5/1967 | O'Brien |
| 3,368,627 A | 2/1968 | Hurst et al. |
| 4,490,985 A | 1/1985 | Wells |
| 4,511,381 A | 4/1985 | Mehra |

(Continued)

FOREIGN PATENT DOCUMENTS

| | | |
|---|---|---|
| DE | 102014010105 A1 | 1/2016 |
| FR | 2466606 A1 | 4/1981 |

(Continued)

OTHER PUBLICATIONS

M. Asadi et al., "Water-Free Fracturing: A Case History", Society of Petroleum Engineers, SPE-175988-MA, 14 Pages.

(Continued)

*Primary Examiner* — Angela M DiTrani Leff
*Assistant Examiner* — Charles R Nold
(74) *Attorney, Agent, or Firm* — Patterson + Sheridan, LLP

(57) ABSTRACT

A method for enhanced or improved oil recovery includes injecting a miscible injection fluid comprising an unfractionated hydrocarbon mixture through an injection well into a hydrocarbon bearing formation. Simultaneously and/or subsequently, a mobility control fluid is injected into the hydrocarbon bearing formation. Residual hydrocarbons in the hydrocarbon bearing formation are mobilized and displaced by the miscible injection fluid and/or the mobility control fluid to a production well through which they are produced to the surface.

15 Claims, 5 Drawing Sheets

(56) References Cited

U.S. PATENT DOCUMENTS

| | | | |
|---|---|---|---|
| 4,828,029 | A | 5/1989 | Irani |
| 6,230,814 | B1 | 5/2001 | Nasr et al. |
| 7,373,790 | B2 | 5/2008 | Clare et al. |
| 8,505,332 | B1 | 8/2013 | Prim |
| 8,844,639 | B2 | 9/2014 | Gupta et al. |
| 8,869,889 | B2 | 10/2014 | Palmer et al. |
| 9,488,040 | B2 | 11/2016 | Chakrabarty et al. |
| 9,534,836 | B2 | 1/2017 | Dubettier-Grenier et al. |
| 2005/0018911 | A1 | 1/2005 | Deever |
| 2005/0189112 | A1 | 9/2005 | Taylor et al. |
| 2006/0289166 | A1 | 12/2006 | Stromquist et al. |
| 2007/0000666 | A1 | 1/2007 | Vozniak et al. |
| 2007/0187340 | A1 | 8/2007 | Oresti et al. |
| 2008/0087041 | A1 | 4/2008 | Denton et al. |
| 2012/0000660 | A1 | 1/2012 | Gatlin et al. |
| 2012/0047942 | A1 | 3/2012 | Kolodziej |
| 2013/0168086 | A1 | 7/2013 | Roberts |
| 2013/0220605 | A1 | 8/2013 | Vandor |
| 2013/0299167 | A1 | 11/2013 | Fordyce et al. |
| 2014/0000899 | A1 | 1/2014 | Nevison |
| 2014/0124208 | A1 | 5/2014 | Loree et al. |
| 2014/0366577 | A1* | 12/2014 | Zubrin ............... F25J 3/0209 62/619 |
| 2015/0021022 | A1 | 1/2015 | Ladva et al. |
| 2015/0060075 | A1* | 3/2015 | Blom ............... E21B 43/168 166/307 |
| 2015/0152318 | A1 | 6/2015 | Travis |
| 2015/0167550 | A1 | 6/2015 | Vandervort et al. |
| 2015/0184932 | A1* | 7/2015 | Higginbotham ........... F25J 3/08 62/620 |
| 2015/0233222 | A1 | 8/2015 | Teklu et al. |
| 2015/0368566 | A1 | 12/2015 | Young et al. |
| 2016/0238313 | A1* | 8/2016 | Shotts ............... C10L 3/12 |
| 2017/0044425 | A1* | 2/2017 | Barati Ghahfarokhi ............... C09K 8/594 |

FOREIGN PATENT DOCUMENTS

| | | |
|---|---|---|
| GB | 2219818 A | 12/1989 |
| RU | 2418158 C2 | 5/2011 |
| RU | 2494233 C2 | 9/2013 |
| WO | 2010025540 A1 | 3/2010 |
| WO | 2012097424 A1 | 7/2012 |
| WO | 2015020654 A1 | 2/2015 |
| WO | 2016064645 A1 | 4/2016 |

OTHER PUBLICATIONS

Ginley, "Osudo Reservoir Fluid Study Jordan B No. 1 Well", http://ocdimage.emnrd.state.nm.us/imaging/filestore/SantaFeAdmin/CF/ADA-03-00539 Case Files Part 6/10796_4159.pdf, pp. 1,5; table 2, Jan. 1, 1992.

Holtz et al., "Summary Integrated Geologic and Engineering Determination of Oil-Reserve-Growth Potential in Carbonate Reservoirs", https://www.onepetro.org/download/journal-paper/SPE-22900-PA?id=journal-paper/SPE-22900-PA, p. 1250 and 1253, Jan. 1, 1992.

Nakashima et al., "SPE-177801-MS Development of a Giant Carbonate Oil Field, Part 2: Mitigation from Pressure Maintenance Developement to Sweep Oriented IOR Development", https://www.onepetro.org/download/conference-paper/SPE-177801-MS?id=conference-paper/SPE-177801-MS, pp. 1-8 and 12-16, Jan. 1, 2015.

Pazuki et al., "A modified Flory-Huggins model for prediction of asphaltenes precipitation in crude oil", Fuel, IPC Science and Technology Press, Guildford, GB, vol. 85, No. 7-8, pp. 1083-1086, May 1, 2016.

Qing Sun et al., "Quantification of uncertainty in recovery efficiency predictions: lessons learned from 250 mature carbonate fields", SPE 84459, pp. 1-15, Jan. 1, 2005.

Rassenfoss; "In Search of the waterless fracture", JPT, Jun. 30, 2013, pp. 46-54, XP055237780.

International Search Report and Written Opinion dated Mar. 29, 2017, corresponding to Application No. PCT/US2016/067454.

Canadian Office Action dated Jul. 29, 2019, corresponding to Application No. 3,019,785.

Russian Office Action and Search Report dated Aug. 2, 2019, corresponding to Application No. 2018139152.

* cited by examiner

MISCIBLE SOLVENT ENHANCED OIL RECOVERY

CROSS-REFERENCE TO RELATED APPLICATION

This application claims priority to U.S. Provisional Application Ser. No. 62/319,856, filed Apr. 8, 2016, which is incorporated by reference herein in its entirety.

FIELD

Embodiments of the disclosure relate to systems and methods for enhanced or improved oil recovery using a miscible solvent.

BACKGROUND

Estimates of worldwide oil in-place range up to 1.5 trillion barrels. Using that figure, since conventional recovery methods (primary and secondary) typically extract one-third of the original oil-in-place in a reservoir, it is estimated that the oil remaining as residual oil saturation after conventional recovery would be approximately 1.0 trillion barrels. Several enhanced oil recovery (EOR) techniques generally grouped together as tertiary production schemes have targeted this resource. In the past, chemical, thermal, and miscible techniques have been used by the industry. These EOR techniques typically involve injection of chemical compounds dissolved in water, the injection of steam, or the injection of a gas that is miscible with the oil in place.

The choice of EOR technique to be used is also dependent on other considerations such as depth, temperature, and amount of oil remaining in place. Much of the design phase of an EOR project is spent in the search for the combination of processes and injection schemes that will maximize oil recovery relative to the cost of implementing a particular technique. Most injection materials in use today have properties that differ considerably from the hydrocarbons in the reservoirs. Such differences in properties can reduce extraction efficiency.

Therefore there is a need for new and improved enhanced or improved oil recovery techniques.

SUMMARY

In one embodiment, a method for enhanced or improved oil recovery comprises injecting a miscible injection fluid through an injection well into a hydrocarbon bearing reservoir to displace hydrocarbons, wherein the miscible injection fluid comprises an unfractionated hydrocarbon mixture that is miscible with hydrocarbons in the hydrocarbon bearing reservoir; injecting a mobility control fluid through the injection well into the hydrocarbon bearing formation after injection of the miscible injection fluid; and producing the displaced hydrocarbons through a production well.

DETAILED DESCRIPTION

Figure 1:
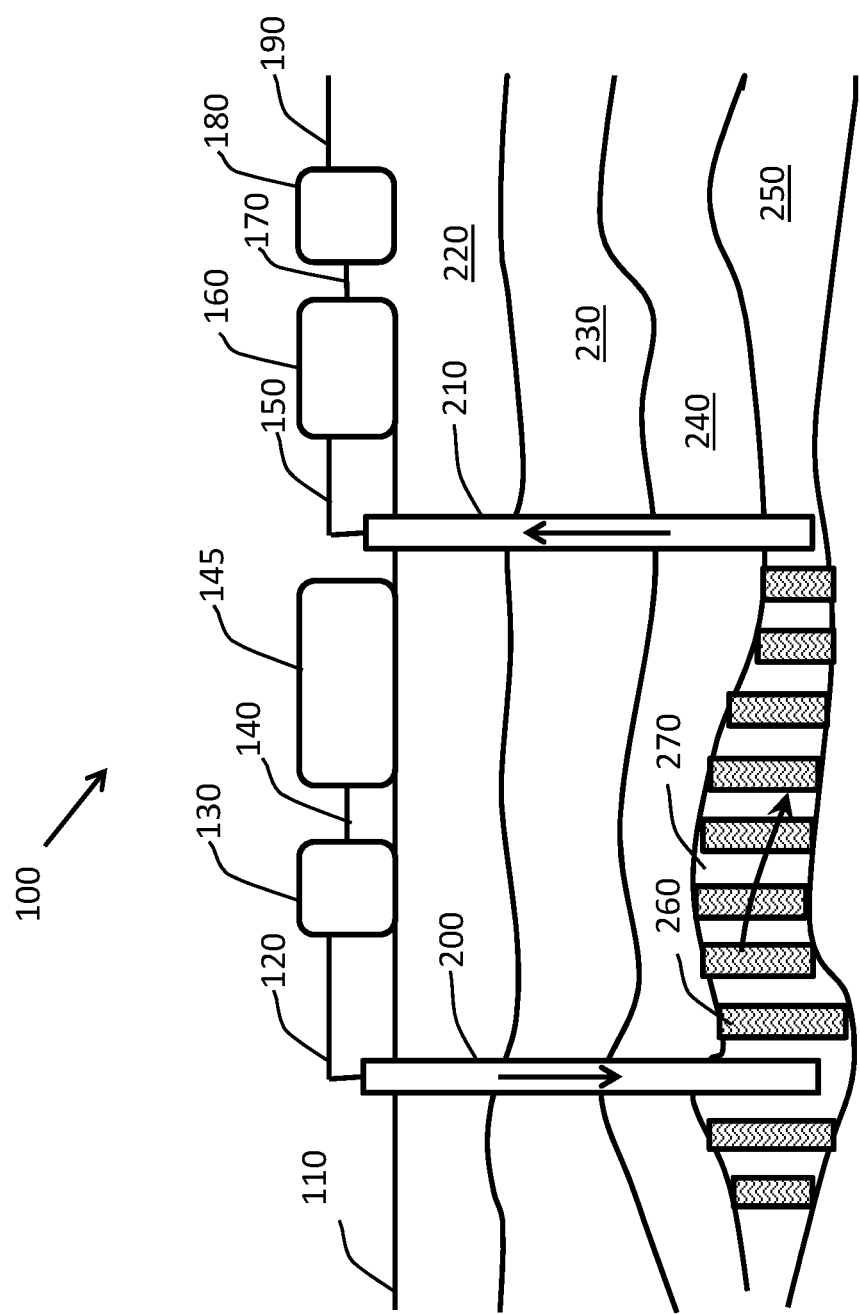
FIG. 1 is a section view of a hydrocarbon bearing reservoir according to one embodiment.

Embodiments of the disclosure include miscible injection fluids used for the enhanced or improved oil recovery of residual hydrocarbons from hydrocarbon bearing reservoirs. The miscible injection fluids comprise naturally occurring, locally available components as a cost effective approach. The miscible injection fluids help reduce and/or eliminate interfacial tension of the residual hydrocarbons to enhance or improve oil recovery.

In one embodiment, the miscible injection fluid may comprise an unfractionated hydrocarbon mixture, such as Y-Grade natural gas liquids (referred to herein as Y-Grade NGL). Y-Grade NGL is similar in viscosity to reservoir oils, which results in good sweep efficiencies when compared to hydrocarbon gases that are often considerably lower in viscosity than the reservoir oils. Sweep efficiencies can be further improved if Y-Grade NGL is injected into the reservoir in small volumes (also referred to as "slugs") that are alternated with slugs of water as a means of lowering the mobility of the injected fluids. Y-Grade NGL is a low cost miscible solvent that is an excellent candidate for miscible solvent enhanced or improved hydrocarbon recovery.

Y-Grade NGL is an un-fractionated hydrocarbon mixture comprising ethane, propane, butane, isobutane, and pentane plus. Pentane plus comprises pentane, isopentane, and/or heavier weight hydrocarbons, for example hydrocarbon compounds containing at least one of C5 through C8+. Pentane plus may include natural gasoline for example.

Typically, Y-Grade NGL is a by-product of de-methanized hydrocarbon streams that are produced from shale wells and transported to a centralized facility. Y-Grade NGL can be locally sourced from a splitter facility, a gas plant, and/or a refinery and transported by truck or pipeline to a point of use. In its un-fractionated or natural state (under certain pressures and temperatures, for example within a range of 250-600 psig and at wellhead or ambient temperature), Y-Grade NGL has no dedicated market or known use. Y-Grade NGL must undergo processing before its true value is proven.

The Y-Grade NGL composition can be customized for handling as a liquid under various conditions. Since the ethane content of Y-Grade NGL affects the vapor pressure, the ethane content can be adjusted as necessary. According to one example, Y-Grade NGL may be processed to have a low ethane content, such as an ethane content within a range of 3-12 percent, to allow the Y-Grade NGL to be transported as a liquid in low pressure storage vessels. According to another example, Y-Grade NGL may be processed to have a high ethane content, such as an ethane content within a range of 38-60 percent, to allow the Y-Grade NGL to be transported as a liquid in high pressure pipelines.

Y-Grade NGL differs from liquefied petroleum gas ("LPG"). One difference is that LPG is a fractionated product comprised of primarily propane, or a mixture of fractionated products comprised of propane and butane. Another difference is that LPG is a fractioned hydrocarbon mixture, whereas Y-Grade NGL is an unfractionated hydrocarbon mixture. Another difference is that LPG is produced in a fractionation facility via a fractionation train, whereas Y-Grade NGL can be obtained from a splitter facility, a gas plant, and/or a refinery. A further difference is that LPG is a pure product with the exact same composition, whereas Y-Grade NGL can have a variable composition.

In its unfractionated state, Y-Grade NGL is not an NGL purity product and is not a mixture formed by combining one or more NGL purity products. An NGL purity product is defined as an NGL stream having at least 90% of one type of carbon molecule. The five recognized NGL purity products are ethane (C2), propane (C3), normal butane (NC4), isobutane (IC4) and natural gasoline (C5+). The unfractionated hydrocarbon mixture must be sent to a fractionation facility, where it is cryogenically cooled and passed through a fractionation train that consists of a series of distillation towers, referred to as deethanizers, depropanizers, and debutanizers, to fractionate out NGL purity products from the unfractionated hydrocarbon mixture. Each distillation tower generates an NGL purity product. Liquefied petroleum gas is an NGL purity product comprising only propane, or a mixture of two or more NGL purity products, such as propane and butane. Liquefied petroleum gas is therefore a fractionated hydrocarbon or a fractionated hydrocarbon mixture.

In one embodiment, Y-Grade NGL comprises 30-80%, such as 40-60%, for example 43%, ethane, 15-45%, such as 20-35%, for example 27%, propane, 5-10%, for example 7%, normal butane, 5-40%, such as 10-25%, for example 10%, isobutane, and 5-25%, such as 10-20%, for example 13%, pentane plus. Methane is typically less than 1%, such as less than 0.5% by liquid volume.

In one embodiment, Y-Grade NGL comprises dehydrated, desulfurized wellhead gas condensed components that have a vapor pressure of not more than about 600 psig at 100 degrees Fahrenheit (° F.), with aromatics below about 1 weight percent, and olefins below about 1% by liquid volume. Materials and streams useful for the methods and systems described herein typically include hydrocarbons with melting points below about 0 degrees Fahrenheit (° F.).

In one embodiment, Y-Grade NGL may be mixed with a viscosity increasing agent, a nonionic surfactant, and/or a crosslinking agent. Y-Grade NGL may be mixed with the nonionic surfactant to create foam. The viscosity increasing agent, the nonionic surfactant, and/or the crosslinking agent may be mixed with a solubilizing fluid for subsequent mixture with the Y-Grade NGL. The solubilizing fluid may comprise fractionated or refined hydrocarbons, such as $C_3$, $C_4$, $C_5$, $C_6$, $C_7$, $C_8$, $C_9$, and mixtures thereof. The solubilizing fluid may comprise C3+ hydrocarbons, including propane, butane, pentane, naphtha, toluene, diesel, natural gasoline, and any combination thereof.

In one embodiment, the miscible injection fluid may comprise an unfractionated hydrocarbon mixture comprising natural gas liquids, condensate (including aromatics), and traces of water, carbon dioxide, and/or hydrogen sulfide (collectively also known as L-Grade). The natural gas liquids in the mixture comprise ethane, propane, butane, isobutane, and pentane plus. Pentane plus comprises pentane, isopentane, and/or heavier weight hydrocarbons, for example hydrocarbon compounds containing C5 through C35. Pentane plus may include natural gasoline for example.

FIG. 1 is a schematic illustration of an enhanced or improved oil recovery system 100 disposed on surface 110 over a hydrocarbon bearing reservoir 250 according to one embodiment. The hydrocarbon bearing reservoir 250 is located below several formations. In particular, a first subsurface formation 220 is disposed above a second subsurface formation 230, which is disposed above a third subsurface formation 240. The first, second, and third subsurface formations are disposed above the hydrocarbon bearing reservoir 250.

An injection well 200 and a production well 210 are drilled through and traverse the first, second, and third subsurface formations 220-240 and terminate in the hydrocarbon bearing reservoir 250. Injection facilities are located on surface 110 and include one or more storage tanks 145 that are connected via line 140 to one or more injection pumps 130 to inject fluids into the injection well 200 via line 120. Production facilities are located on surface 110 and include one or more separators 160 that receive produced fluids from the production well 210 via line 150. The separators 160 separate liquids and gases from the produced fluids. The separated liquids are stored in one or more storage tanks 180 via line 170 and the separated gases are transported off via pipeline 190.

In one embodiment, a method of enhanced or improved oil recovery comprises alternating injections of a miscible injection fluid 260 and a mobility control fluid 270 into the hydrocarbon bearing reservoir 250. The method includes injecting pressurized, defined volumes of the miscible injection fluid 260 (such as Y-Grade NGL supplied from the storage tanks 145) through the injection well 200 and into the hydrocarbon bearing reservoir 250 at a pressure which the miscible injection fluid 260 remains miscible with liquid hydrocarbons in the hydrocarbon bearing reservoir 250. The method further includes injecting pressurized, defined volumes of the mobility control fluid 270 (such as water, carbon dioxide, and/or nitrogen supplied from the storage tanks 145) through the injection well 200 and into the hydrocarbon bearing reservoir 250 after injection of the miscible injection fluid 260.

In one embodiment, the miscible injection fluid 260 may be mixed with the mobility control fluid 270 (such as water, carbon dioxide, and/or nitrogen) and simultaneously injected into the hydrocarbon bearing reservoir 250, followed by injection of the mobility control fluid 270 (such as water, carbon dioxide, and/or nitrogen) only. The method may include alternating injections of pressurized, defined volumes of a mixture of the miscible injection fluid 260 and the mobility control fluid 270 (such as water, carbon dioxide, and/or nitrogen) with injections of pressurized, defined volumes of the same or different mobility control fluid 270 (such as water, carbon dioxide, and/or nitrogen) only.

In one embodiment, injections of the miscible injection fluid 260 mixed with the mobility control fluid 270 may be alternated with injections of the same or different miscible injection fluid 260 only within the hydrocarbon bearing reservoir 250 to inhibit or prevent breakthrough of the miscible injection fluid 260 from the injection wells 200 to the production wells 210.

Alternating and/or mixing volumes of the miscible injection fluid 260 and the mobility control fluid 270 mobilize and displace residual oil in the hydrocarbon bearing reservoir 250 to the production well 210. Mobilized oil, the miscible injection fluid 260, the mobility control fluid 270, and/or other reservoir fluids (collectively referred to as "produced fluids") are produced to the surface 110 through the production well 210 and directed into the separators 160 via line 150, into the storage tanks 180 via line 170, and to the pipeline 190. Gas separated in the separators 160 is sent to the pipeline 190, while separated liquids (such as liquid hydrocarbons and water) are stored in the storage tanks 180.

The mobility control fluid 270 may be used to inhibit the mobility of the miscible injection fluid 260 within the hydrocarbon bearing reservoir 250 to prevent a rapid breakthrough of the miscible injection fluid 260 from the injection well 200 to the production well 210. Slowing the time it takes for the miscible injection fluid 260 to reach the production well 210 increases the time for the miscible injection fluid 260 to mobilize and displace the residual oil in the hydrocarbon bearing reservoir 250 to increase recovery efficiency.

Figure 2:
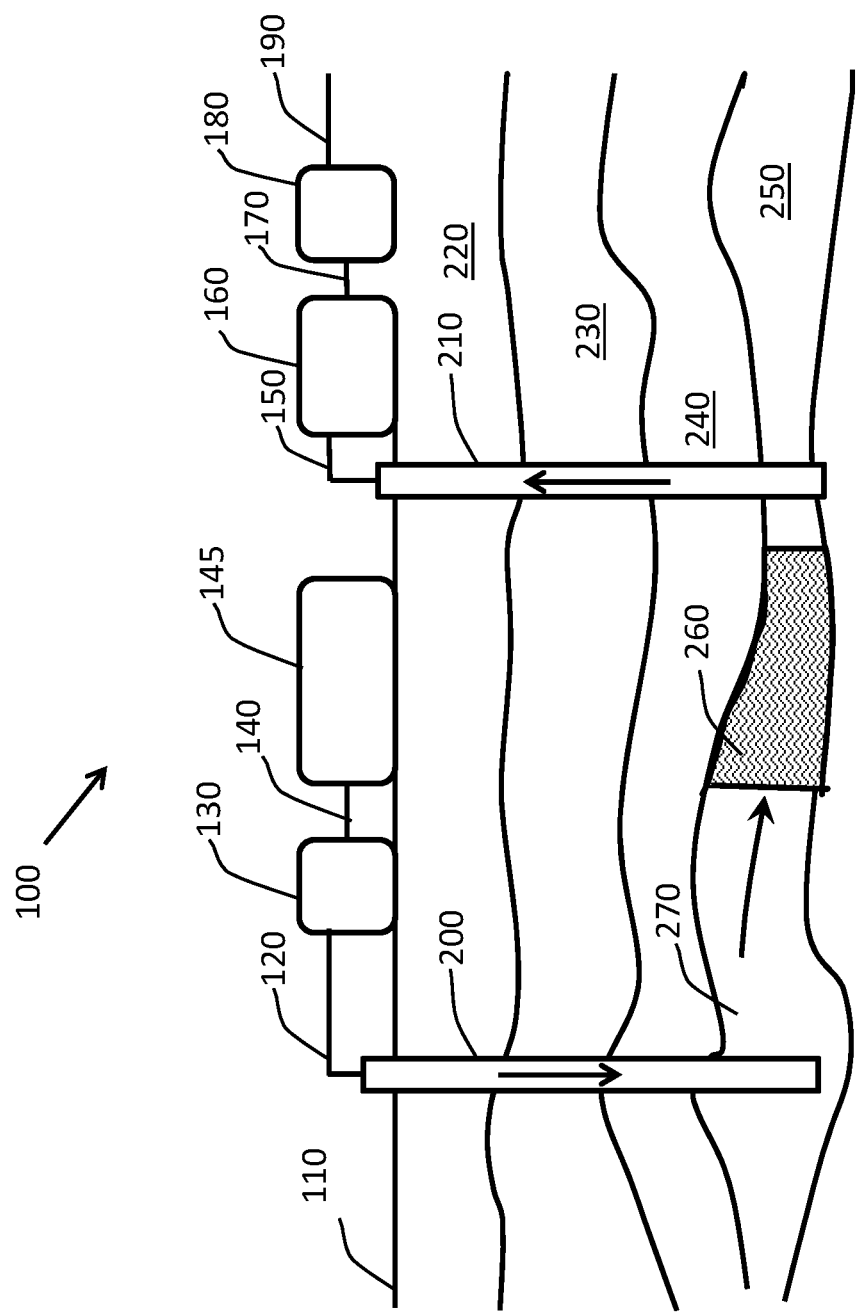
FIG. 2 is a section view of a hydrocarbon bearing reservoir according to one embodiment.

FIG. 2 is a schematic illustration of an enhanced or improved recovery system 100 disposed on surface 110 over a hydrocarbon bearing reservoir 250 according to one embodiment. The hydrocarbon bearing reservoir 250 is located below several formations. In particular, a first subsurface formation 220 is disposed above a second subsurface formation 230, which is disposed above a third subsurface formation 240. The first, second, and third subsurface formations are disposed above the hydrocarbon bearing reservoir 250.

The injection facilities are located on surface 110 and include one or more storage tanks 145 that are connected via line 140 to one or more injection pumps 130 to inject fluids into the injection well 200 via line 120. The production facilities are located on surface 110 and include one or more separators 160 that receive produced fluids from the production well 210 via line 150. The separators 160 separate liquids and gases from the produced fluids. The separated liquids are stored in one or more storage tanks 180 via line 170 and the separated gases are transported off via pipeline 190.

In one embodiment, a method of enhanced or improved oil recovery comprises injecting the miscible injection fluid 260 into the hydrocarbon bearing reservoir 250 followed by injecting the mobility control fluid 270 into the hydrocarbon bearing reservoir 250. A pressurized volume of miscible injection fluid 260 (such as Y-Grade NGL supplied from the storage tanks 145) is pumped down the injection well 200 and injected into the hydrocarbon bearing reservoir 250 at a pressure which the miscible injection fluid 260 remains miscible with liquid hydrocarbons in the hydrocarbon bearing reservoir 250. A pressurized volume of mobility control fluid 270 (such as water, carbon dioxide, and/or nitrogen supplied from the storage tanks 145) is pumped down the injection well 200 and injected into the hydrocarbon bearing reservoir 250 after injection of the miscible injection fluid 260.

In one embodiment, the miscible injection fluid 260 may be mixed with the mobility control fluid 270 (such as water, carbon dioxide, and/or nitrogen) and simultaneously injected into the hydrocarbon bearing reservoir 250, followed by injection of the mobility control fluid 270 (such as water, carbon dioxide, and/or nitrogen) only. The method may include injecting a pressurized, defined volume of a mixture of the miscible injection fluid 260 and the mobility control fluid 270 (such as water, carbon dioxide, and/or nitrogen) into the hydrocarbon bearing reservoir 250, and then injecting a pressurized, defined volume of the same or different mobility control fluid 270 (such as water, carbon dioxide, and/or nitrogen) only.

In one embodiment, an injection of the miscible injection fluid 260 mixed with the mobility control fluid 270 may be followed by an injection of the same or different miscible injection fluid 260 only within the hydrocarbon bearing reservoir 250 to inhibit or prevent breakthrough of the miscible injection fluid 260 from the injection wells 200 to the production wells 210.

The mobility control fluid 270 may be used to inhibit the mobility of the miscible injection fluid 260 within the hydrocarbon bearing reservoir 250 to prevent a rapid breakthrough of the miscible injection fluid 260 from the injection well 200 to the production well 210. Slowing the time it takes for the miscible injection fluid 260 to reach the production well 210 increases the time for the miscible injection fluid 260 to mobilize and displace the residual hydrocarbons in the hydrocarbon bearing reservoir 250 to increase recovery efficiency.

The miscible injection fluid 260 initially mobilizes and displaces residual hydrocarbons in the hydrocarbon bearing reservoir 250 to the production well 210. The mobility control fluid 270 simultaneously and/or subsequently mobilizes and displaces residual hydrocarbons as well the miscible injection fluid 260 in the hydrocarbon bearing reservoir 250 to the production well 210. Mobilized oil, the miscible injection fluid 260, the mobility control fluid 270, and/or other reservoir fluids (collectively referred to as "produced fluids") are produced to the surface 110 through the production well 210 and directed into the separators 160 via line 150, into the storage tanks 180 via line 170, and to the pipeline 190. Gas separated in the separators 160 is sent to the pipeline 190, while separated liquids (such as liquid hydrocarbons and water) are stored in the storage tanks 180.

Figure 3:
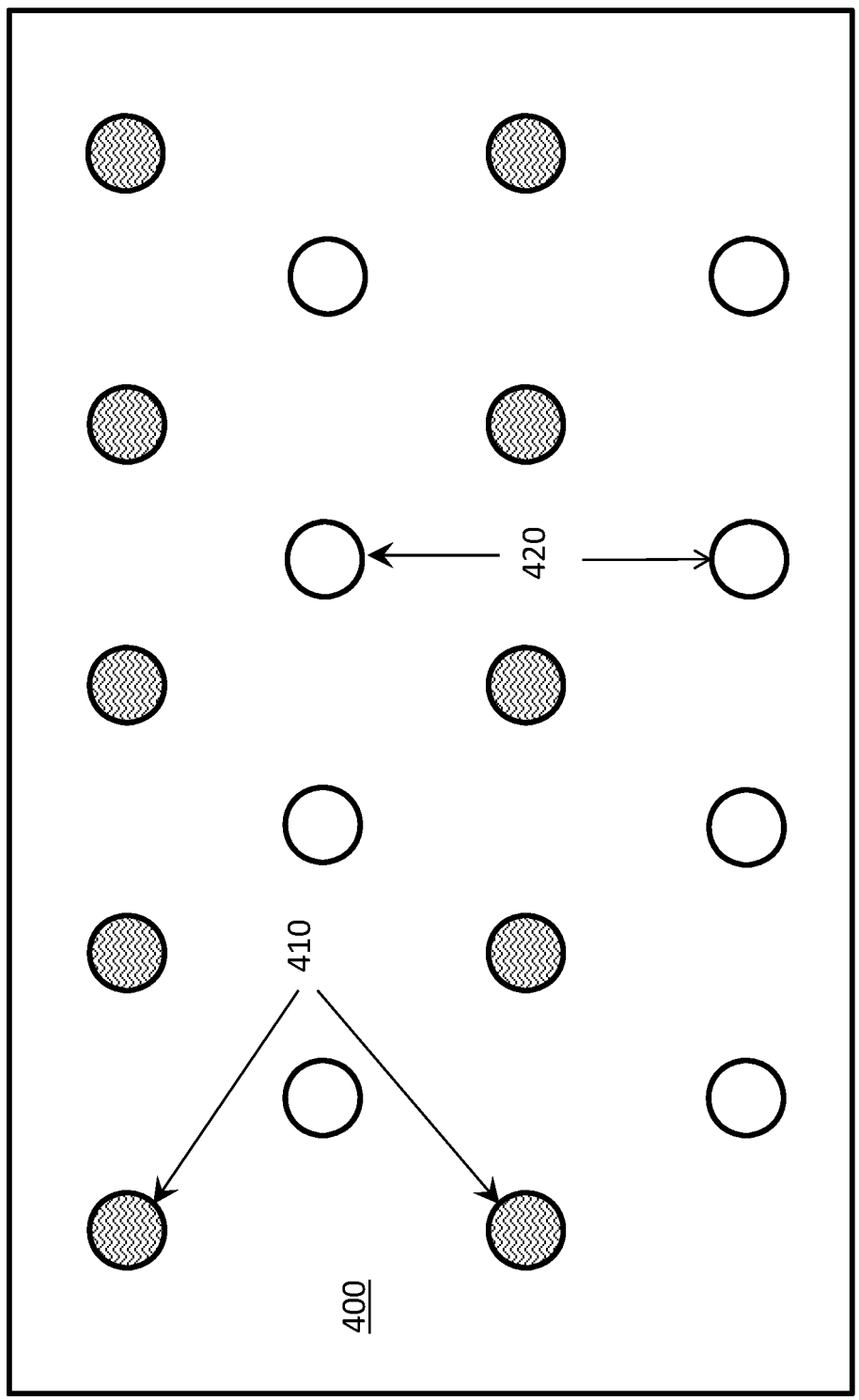
FIG. 3 is a plan view of a hydrocarbon bearing reservoir according to one embodiment.

FIG. 3 is a plan view of an array of wells 400 that can be used to implement the methods of enhanced or improved oil recovery disclosed herein. The array of wells 400 includes a first well group 410 (denoted with internal patterning) that are offset from a second well group 420 (denoted without internal patterning). The first well group 410 can be used as the injection well 200 shown in FIGS. 1 and 2, while the second well group 420 can be used as the production well 210 shown in FIGS. 1 and 2. Alternately, the second well group 420 may be used for injection, while the first well group 410 may be used for production from the hydrocarbon bearing reservoir 250. The first and/or second well group 410, 420 may have about 2 wells to about 500 wells. The first well group 410 may have the same number, a greater number, or a lesser number of wells than the second well group 420.

Figure 4:
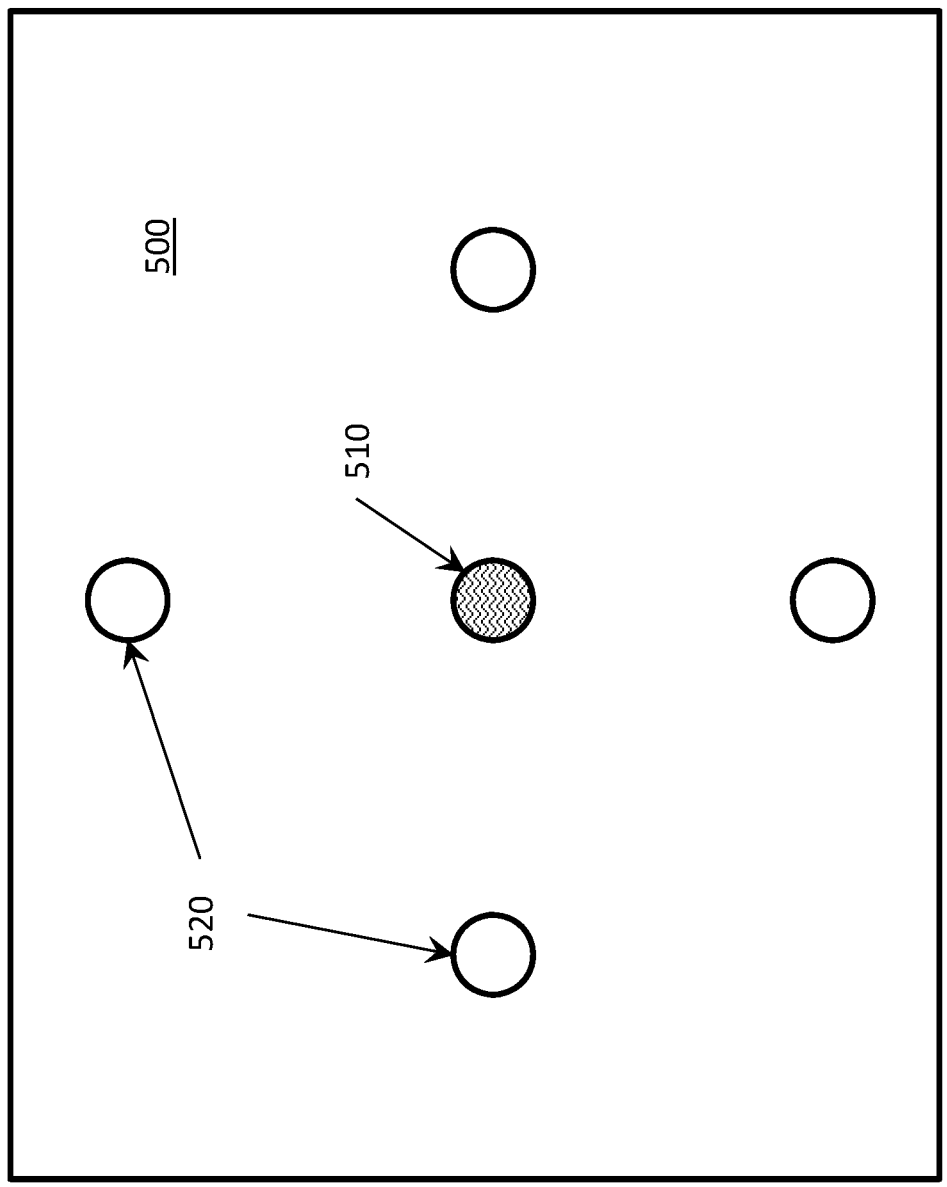
FIG. 4 is a plan view of a hydrocarbon bearing reservoir according to one embodiment.

FIG. 4 is a plan view of an array of wells 500 that can be used to implement the methods of enhanced or improved oil recovery disclosed herein. The array of wells 500 includes a first well 510 (denoted with internal patterning) that is offset from and disposed between a second well group 520 (denoted without internal patterning). The first well 510 can be used as the injection well 200 shown in FIGS. 1 and 2, while the second well group 520 can be used as the production well 210 shown in FIGS. 1 and 2. Alternately, the second well group 520 may be used for injection, while the first well 510 may be used for production from the hydrocarbon bearing reservoir 250. The second well group 520 may have about 2 wells to about 500 wells.

The time period at which the miscible injection fluid 260 is injected into the hydrocarbon bearing reservoir 250 may be equal to, greater than, or less than the time period at which the mobility control fluid 270 is injected into the hydrocarbon bearing reservoir 250. The total volume (or defined volumes) of miscible injection fluid 260 that are injected into the hydrocarbon bearing reservoir 250 may be equal to, greater than, or less than the total volume (or defined volumes) of mobility control fluid 270 that are injected into the hydrocarbon bearing reservoir 250. The mobility control fluid 270 may be a liquid or a gas. The mobility control fluid may comprise water, carbon dioxide, nitrogen, or any combination thereof.

In one embodiment, the injection well 200 may be a vertical well or a horizontal well. In one embodiment, the production well 210 may be a vertical well or a horizontal well. In one embodiment, the first well group 410 and/or the second well groups 420, 520 may be all vertical wells, all horizontal wells, or a combination of vertical and horizontal wells.

In one embodiment, the viscosity of the hydrocarbons in the hydrocarbon bearing reservoir 250 prior to injection of the miscible injection fluid 260 and/or the mobility control fluid 270 may be about 5 centipoise to about 100,000 centipoise. In one embodiment, the permeability of the hydrocarbon bearing reservoir 250 prior to injection of the miscible injection fluid 260 and/or the mobility control fluid 270 may be about 0.0001 Darcies to about 10 Darcies. In one embodiment, the injection pressure of the miscible injection fluid 260 and/or the mobility control fluid 270 may be about 0 psi (or head pressure of the fluid) to about 10,000 psi.

In one embodiment, the miscible injection fluid 260 may comprise Y-Grade NGL, carbon dioxide, nitrogen, or any combination thereof. In one embodiment, carbon dioxide and/or nitrogen may be injected into line 120 or line 140 and mixed with the miscible injection fluid 260 (such as Y-Grade NGL) supplied from the storage tanks 145 for injection into the hydrocarbon bearing reservoir 250. In one embodiment, carbon dioxide and/or nitrogen may be premixed with the miscible injection fluid 260 (such as Y-Grade NGL) in the storage tanks 145 for injection into the hydrocarbon bearing reservoir 250.

In one embodiment, the miscible injection fluid 260 and/or the mobility control fluid 270 may be injected into the hydrocarbon bearing reservoir 250 through the injection well 200 at the same time that (simultaneously as) the produced fluids are being recovered back to the surface through the production well 210, while maintaining a pressure and/or a temperature within the hydrocarbon bearing reservoir 250 at which the miscible injection fluid 260 remains miscible with the liquid hydrocarbons in the hydrocarbon bearing reservoir 250. In one embodiment, the pressure and/or temperature within the hydrocarbon bearing reservoir 250 at which the miscible injection fluid 260 remains miscible with the liquid hydrocarbons in the hydrocarbon bearing reservoir 250 is above the dew point of the miscible injection fluid 260.

In one embodiment, the miscible injection fluid 260 may be mixed with a viscosity increasing agent, a nonionic surfactant, and/or a crosslinking agent. The viscosity increasing agent may comprise phosphate esters, amine carbamates, aluminum soaps, cocoamine (C12-C14), sebacoyl chloride, oley (C18) amine, toulen-2, 4-diisocyanate, tolune-2, 6-diisolcyanate, and any combination thereof. The nonionic surfactant may be mixed with the miscible injection fluid to create foam. The crosslinking agent may comprise organometallic complex cross-linkers. The crosslinking agent may comprise boron.

In one embodiment, a solubilizing fluid may be mixed with the viscosity increasing agent, the nonionic surfactant, and/or the crosslinking agent to solubilize the viscosity increasing agent, the nonionic surfactant, and/or the crosslinking agent for subsequent mixing with the miscible injection fluid 260. The solubilizing fluid may comprise fractionated or refined hydrocarbons, such as $C_3$, $C_4$, $C_5$, $C_6$, $C_7$, $C_8$, $C_9$, and any combination thereof. The solubilizing fluid may comprise C3+ hydrocarbons, such as propane, butane, pentane, naphtha, toluene, diesel, natural gasoline, and any combination thereof.

In one embodiment, the hydrocarbon bearing reservoir 250 may be a previously treated reservoir. In one embodiment, the hydrocarbon bearing reservoir 250 may be a previously fractured reservoir. In one embodiment, the hydrocarbon bearing reservoir 250 may be a fractured carbonate reservoir having a high structural relief (e.g. a steeply dipping structure or formation).

Figure 5:
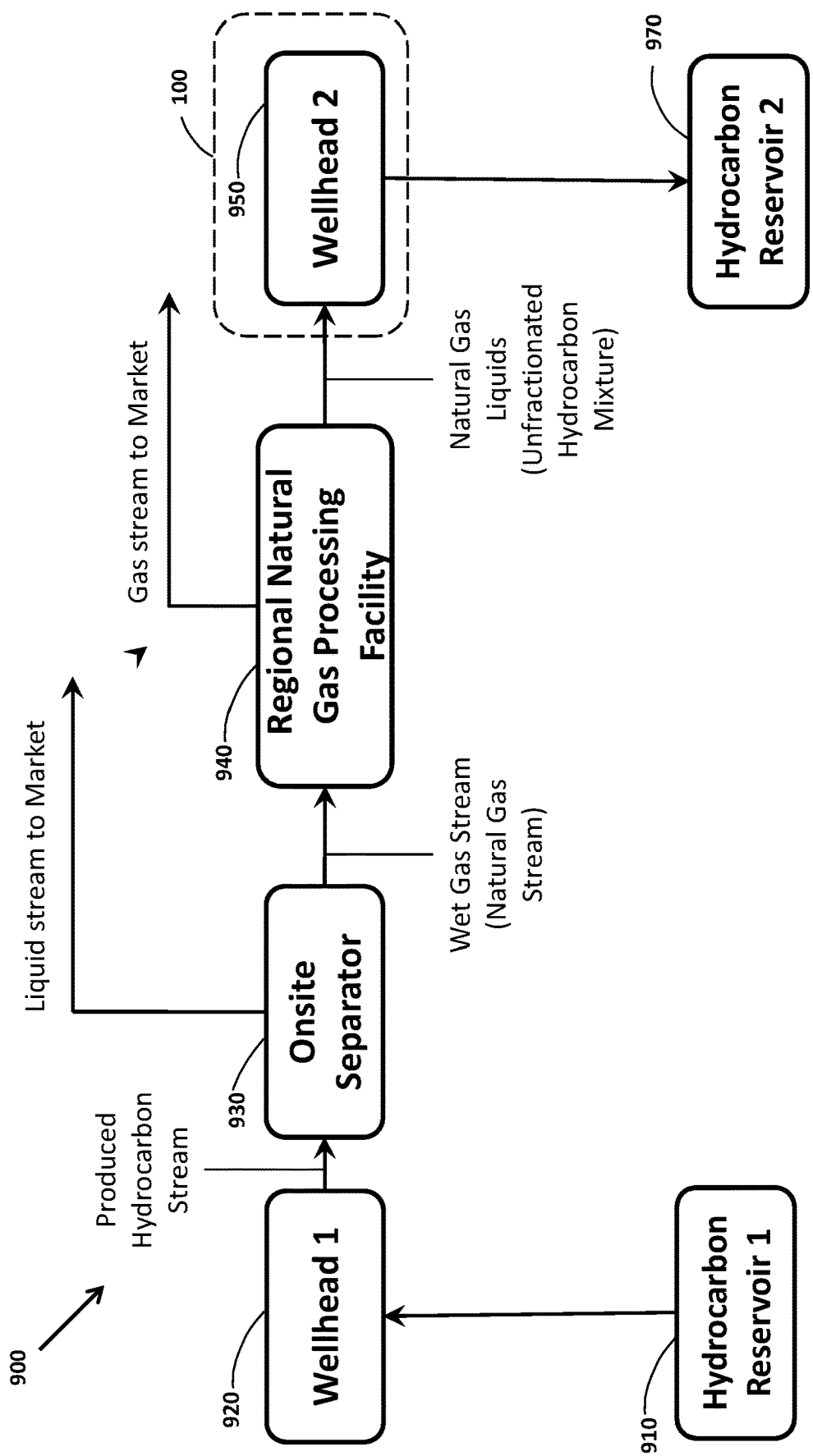
FIG. 5 is a plan view of a fluid recovery system according to one embodiment.

FIG. 5 illustrates one embodiment of a fluid recovery system 900 for obtaining Y-Grade NGL that can be used with any of the enhanced or improved oil recovery systems 100. As illustrate in FIG. 5, a stream of hydrocarbons are produced from a first hydrocarbon reservoir 910 to the surface via a first wellhead 920 where the produced hydrocarbon stream is flash separated onsite by an onsite separator 930 into a wet gas stream (also referred to as a natural gas stream) and a liquid stream. The natural gas stream is transported, via pipeline for example, to a regional natural gas processing facility 940 where it is further processed, and the liquid stream is transported to field storage for example where it is sold into the market.

The natural gas stream enters the natural gas processing facility 940 where it is dehydrated and decontaminated of CO2, H2S, and N2. The dehydrated and decontaminated natural gas stream is then expanded and cooled to condense out natural gas liquids. These natural gas liquids ("NGL") are an unfractionated hydrocarbon mixture, which is referred to as Y-Grade NGL, raw mix, or unfractionated NGL. The remaining gas stream is transported to a pipeline for example where it is sold into the market.

The unfractionated hydrocarbon mixture is a liquid mixture that has been condensed from the natural gas stream at the natural gas processing facility 940. The condensation process is the result of expanding and cooling the natural gas stream to condense out the unfractionated hydrocarbon mixture, a process also referred to as de-methanizing the natural gas stream. The unfractionated hydrocarbon mixture is therefore a natural byproduct of a de-methanized hydrocarbon stream.

The unfractionated hydrocarbon mixture is then transported via a pipeline for example to a targeted reservoir for use as a miscible injection fluid 260 with any of the enhanced or improved oil recovery systems 100. The miscible injection fluid 260 may be injected via a second wellhead 950 into a second hydrocarbon bearing reservoir 970 (such as the hydrocarbon bearing reservoir 250 via the injection well 200 shown in FIGS. 1 and 2) using the methods and system described above.

While the foregoing is directed to certain embodiments, other and further embodiments may be devised without departing from the basic scope of this disclosure.

We claim:

1. A method for enhanced or improved oil recovery, comprising:
    injecting an unfractionated hydrocarbon liquid miscible injection fluid through an injection well into a hydrocarbon bearing reservoir to displace hydrocarbons, wherein the unfractionated hydrocarbon liquid miscible injection fluid is miscible with hydrocarbons in the hydrocarbon bearing reservoir, wherein the unfractionated hydrocarbon liquid miscible injection fluid is a byproduct of a condensed and de-methanized hydrocarbon stream, wherein the unfractionated hydrocarbon liquid miscible injection fluid is condensed out of the hydrocarbon stream at a temperature at or below 0 degrees Fahrenheit, and wherein the unfractionated hydrocarbon liquid miscible injection fluid comprises at least ethane, propane, butane, isobutane, pentane plus, and less than 1 percent methane by liquid volume;
    injecting a mobility control fluid through the injection well into the hydrocarbon bearing formation to inhibit mobility of the unfractionated hydrocarbon liquid miscible injection fluid from the injection well to a production well; and producing the displaced hydrocarbons through the production well.

2. The method of claim 1, wherein the injection well comprises an array of vertical injection wells, and wherein the production well comprises an array of vertical production wells offset from the array of vertical injection wells.

3. The method of claim 1, further comprising simultaneously injecting the miscible injection fluid with the mobility control fluid into the hydrocarbon bearing reservoir.

4. The method of claim 1, further comprising alternating injections of the miscible injection fluid with injections of the mobility control fluid into the hydrocarbon bearing reservoir.

5. The method of claim 1, further comprising simultaneously injecting the miscible injection fluid with the mobility control fluid into the hydrocarbon bearing reservoir, and then injecting the same or different mobility control fluid into the hydrocarbon bearing reservoir.

6. The method of claim 1, wherein the mobility control fluid comprises at least one of carbon dioxide, nitrogen, and water.

7. The method of claim 6, further comprising simultaneously injecting the miscible injection fluid with the mobility control fluid into the hydrocarbon bearing reservoir.

8. The method of claim 6, further comprising alternating injections of the miscible injection fluid with injections of the mobility control fluid into the hydrocarbon bearing reservoir.

9. The method of claim 6, further comprising injecting the miscible injection fluid with the mobility control fluid into the hydrocarbon bearing reservoir, and then injecting the same or a different mobility control fluid into the hydrocarbon bearing reservoir.

10. The method of claim 1, wherein the viscosity of hydrocarbons in the hydrocarbon bearing reservoir is between 5 centipoise to 100,000 centipoise.

11. The method of claim 1, wherein the injection pressure of the miscible injection fluid is between 0 psi to 10,000 psi.

12. The method of claim 1, wherein the injection pressure of the mobility control fluid is between 0 psi to 10,000 psi.

13. The method of claim 1, wherein the permeability of the hydrocarbon bearing reservoir is between 0.0001 Darcies and 10 Darcies.

14. The method of claim 1, further comprising mixing at least one of a viscosity increasing agent, a nonionic surfactant, and a cross-linking agent with the miscible injection fluid for injection into the hydrocarbon bearing reservoir.

15. The method of claim 1, further comprising mixing a nonionic surfactant with the miscible injection fluid to create foam for injection into the hydrocarbon bearing reservoir.

* * * * *